US009159064B1

(12) United States Patent
Inotay et al.

(10) Patent No.: US 9,159,064 B1
(45) Date of Patent: Oct. 13, 2015

(54) SYSTEMS AND METHODS FOR AN ISSUER CERTIFIED CARD

(71) Applicant: Cellum Innovacios es Szolgaltato Zrt., Budapest (HU)

(72) Inventors: Balazs Inotay, Budapest (HU); Zoltan Acs, Budapest (HU)

(73) Assignee: CELLUM INNOVACIOS ES SZOLGALTATO ZRT., Budapest (HU)

( * ) Notice: Subject to any disclaimer, the term of this patent is extended or adjusted under 35 U.S.C. 154(b) by 0 days.

(21) Appl. No.: 14/223,420

(22) Filed: Mar. 24, 2014

(51) Int. Cl.
*G06K 5/00* (2006.01)
*G06Q 20/34* (2012.01)

(52) U.S. Cl.
CPC .................................. *G06Q 20/354* (2013.01)

(58) Field of Classification Search
CPC ................................ G06K 7/1417; G07F 7/08
USPC ............. 235/380, 382, 462.9, 462.1, 462.45, 235/472.01
See application file for complete search history.

(56) References Cited

U.S. PATENT DOCUMENTS

| 7,597,250 | B2* | 10/2009 | Finn | 235/380 |
| 2007/0078780 | A1* | 4/2007 | Tran et al. | 705/65 |
| 2010/0299194 | A1* | 11/2010 | Snyder et al. | 705/14.13 |
| 2011/0089233 | A1* | 4/2011 | Locher | 235/380 |

* cited by examiner

Primary Examiner — Daniel St Cyr
(74) Attorney, Agent, or Firm — Christopher J. McKenna; Foley & Lardner LLP

(57) ABSTRACT

The present solution is directed to an architecture and a process for registering cards for use, such as bank cards, credit cards, loyalty cards, club cards, or any other card that is configured to carry data or monetary value. The solution provides safe and fast means for registering the card in a mobile computing environment. The system enables a card issuer to unambiguously identify an end user—for example, by one or two factor authentication. Responsive to the identification of the end user by the system, a 2D code that encodes the data needed for registration of the card is presented to the user. The data can be encrypted and the method of delivery to the user can be selected by user or the card issuer. With a mobile application, the user scans the presented 2D code. The mobile application transmits the data of the 2D code to the server, which decrypts and verifies the data. Responsive to decrypting and verifying the data, the card of the card holder is registered. In some implementations, the user may also wish to register the card with an e-wallet application on their mobile devices, such that the user may use the card from the mobile device at a later date.

36 Claims, 11 Drawing Sheets

SYSTEMS AND METHODS FOR AN ISSUER CERTIFIED CARD

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

BACKGROUND OF THE DISCLOSURE

Two dimensional (2D) codes (e.g., bar codes) allow for a few kilobytes of information to be stored and decoded using image processing algorithms. Today, these 2D codes are often scanned and decoded by smartphones or other mobile devices.

BRIEF SUMMARY OF THE DISCLOSURE

The present solution is directed to an architecture and a process for registering cards for use, such as bank cards, credit cards, loyalty cards, club cards, or any other card that is configured to carry data or monetary value. The solution provides safe and fast means for registering the card in a mobile computing environment. The system enables a card issuer to unambiguously identify an end user—for example, by one or two factor authentication. Responsive to the identification of the end user by the system, a 2D code that encodes the data needed for registration of the card is presented to the user. The data can be encrypted and the method of delivery to the user can be selected by user or the card issuer. With a mobile application, the user scans the presented 2D code. The mobile application transmits the data of the 2D code to the server, which decrypts and verifies the data. Responsive to decrypting and verifying the data, the card of the card holder is registered. In some implementations, the user may also wish to register the card with an e-wallet application on their mobile devices, such that the user may use the card from the mobile device at a later date.

According to one aspect of the disclosure, a method for providing registration of a card of a card holder via a two-dimension code includes identifying, by a server providing registration of cards of card holders, a card holder of a card. A two-dimension (2D) code encoded with registration information for the card of the card holder is then generated. At least a portion of the registration information is encrypted via asymmetric encryption. The method also includes transmitting, by the server, to a device of the card holder, the 2D code to provide to the server for registration of the card.

In some implementations, the method can include registering, by the server, the card of the card holder upon decrypting and verification of the registration information received by the server from an application on the device of the card holder that scanned the 2D code. In some implementations, the application can include a mobile wallet of the card holder and the card is a mobile payment instrument.

In some implementations, the method also includes authenticating, by the server, the card holder via one or two-factor authentication and/or biometric authentication. Information about the card or card holder can be validated with a third party server, such as that of an issuer. In some implementations, the third party also provides at least a portion of the registration information to encode in the 2D code.

In some implementations, the method also includes generating the registration information for the card of the card holder to be encoded in the 2D code. The method can also include encrypting the registration information encoded in the 2D code. In some implementations, the 2D code is a motion code including a sequence of a plurality of 2D codes to be displayed at a frequency, each of the plurality of 2D codes encoded with a portion of the registration information. The method can also include transmitting, by the server, the 2D code via a secure communication channel between the server and the device of the card holder.

The method can also include receiving, by the server from the device of the card holder, content from a scan of the 2D code by the device, the content including the registration information. The server may then decrypt the encrypted portion of the registration information. The card is then registered using the decrypted and unencrypted portions of the registration information.

In some implementations, the method includes validating, by the server, a portion of the registration information via a third party server. The card can be one a bank card, a loyalty card, a rewards card, a points card, an advantage car and a club card.

In some implementations, the registration information can include at least one of information visible on the corresponding card or information not visible and encoded on the corresponding card. The method can also include receiving, by the server, a pin assigned to the card holder from one of an application on the device of the card holder in which the card holder enters the pin via the application or from the 2D code, and controlling, by the server, access to the server by confirming the pin.

According to another aspect of the disclosure, a system for providing registration of a card of a card holder via a two-dimension code includes a server. The server is configured to register cards of card holders. The server includes an authentication module configured to identify a card holder of a card and a generator. The generator is configured to generate a two-dimension (2D) code encoded with registration information for the card of the card holder, at least a portion of the registration information encrypted via asymmetric encryption. The server also includes a transmitter configured to transmit to a device of the card holder the 2D code to provide to the server for registration of the card.

In some implementations, the server can also be configured to register the card of the card holder upon decrypting and verification of the registration information received by the server from an application on the device of the card holder that scanned the 2D code. The application can include a mobile wallet of the card holder and the card can be a mobile payment instrument.

In some implementations, the authenticator is configured to authenticate the card holder via one or two-factor authentication and/or biometric authentication. The server may also be configured to validate registration information on one of the card or the card holder via a third party server. The server may also be configured to receive at least a portion of the registration information to encode in the 2D code from a third party server. The server can be configured to transmit the 2D code via a secure communication channel between the server and the device of the card holder.

In some implementations, the generator is configured to generate the registration information for the card of the card holder to be encoded in the 2D code. The generator may generate a 2D code that is a motion code including a sequence of a plurality of 2D codes to be displayed at a frequency, each of the plurality of 2D codes encoded with a portion of the registration information. The generator may also be configured to encrypt the registration information encoded in the 2D code.

The receiver of the server can be configured to receive from the device of the card holder, content from a scan of the 2D code by the device, the content including the registration information. The server can also include a decryptor configured to decrypt the encrypted portion of the registration information.

The server may also include a registrar to register the card of the card holder using the decrypted portion of the registration information. The registrar can be further configured to validate a portion of the registration information via a third party server.

In some implementations, the registration information includes information visible on the corresponding card or information not visible and encoded on the corresponding card. The server can also be configured to receive a pin, assigned to the card holder by the server, from one of an application on the device of the card holder in which the card holder enters the pin via the application or from the 2D code. The server can be configured to control access to the server by validating the pin.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful Section A describes a network environment and computing environment which may be useful for practicing embodiments described herein.

Section B describes embodiments of systems and methods for generating and displaying motion QR codes.

Section C describes embodiments of systems and methods for an issuer certified card.

A. Computing and Network Environment

Figure 1A:
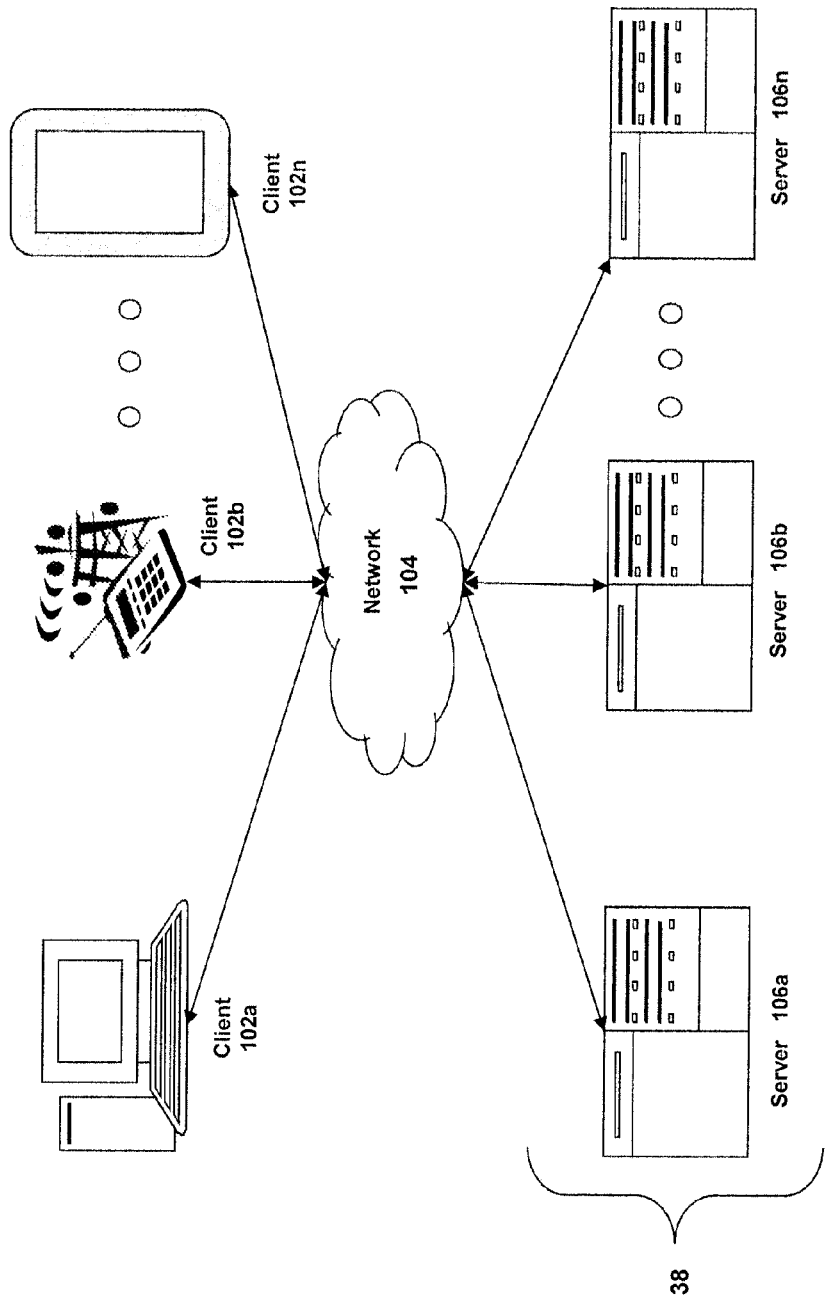
FIG. 1A is a block diagram depicting an embodiment of a network environment comprising client device in communication with server device in accordance with an implementation of the present disclosure.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
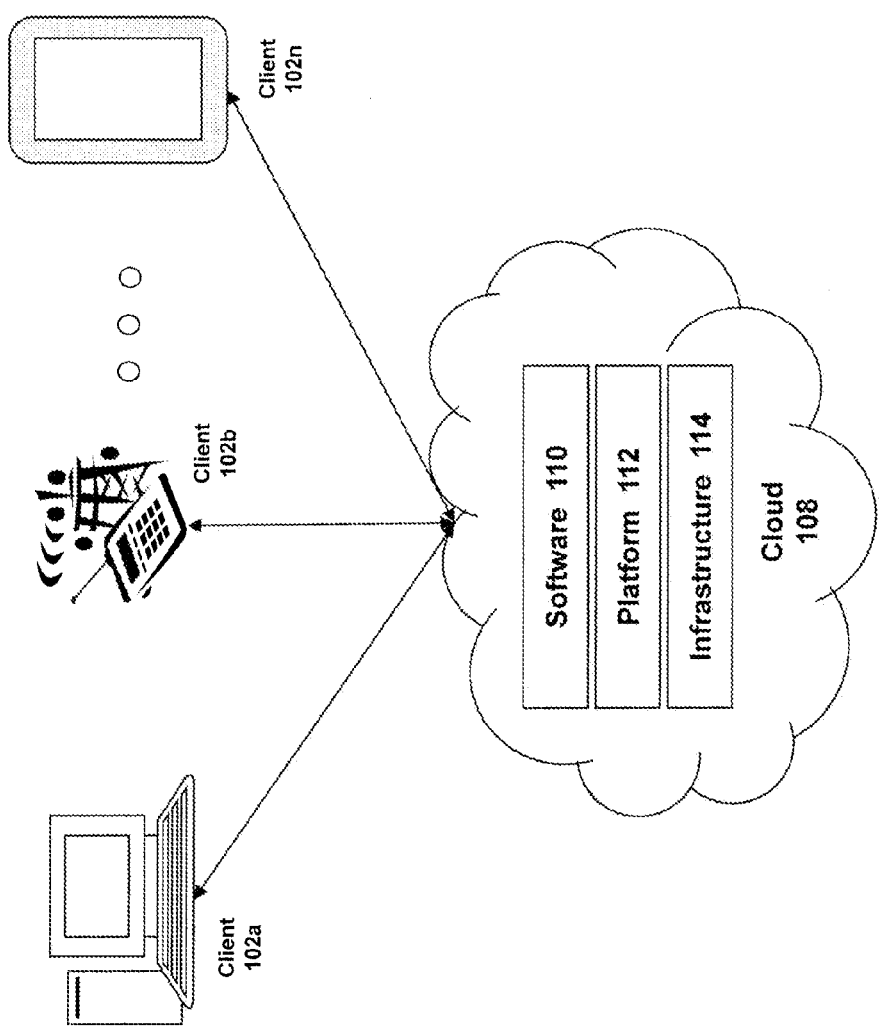
FIG. 1B is a block diagram depicting a cloud computing environment comprising client device in communication with cloud service providers in accordance with an implementation of the present disclosure.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise.

Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
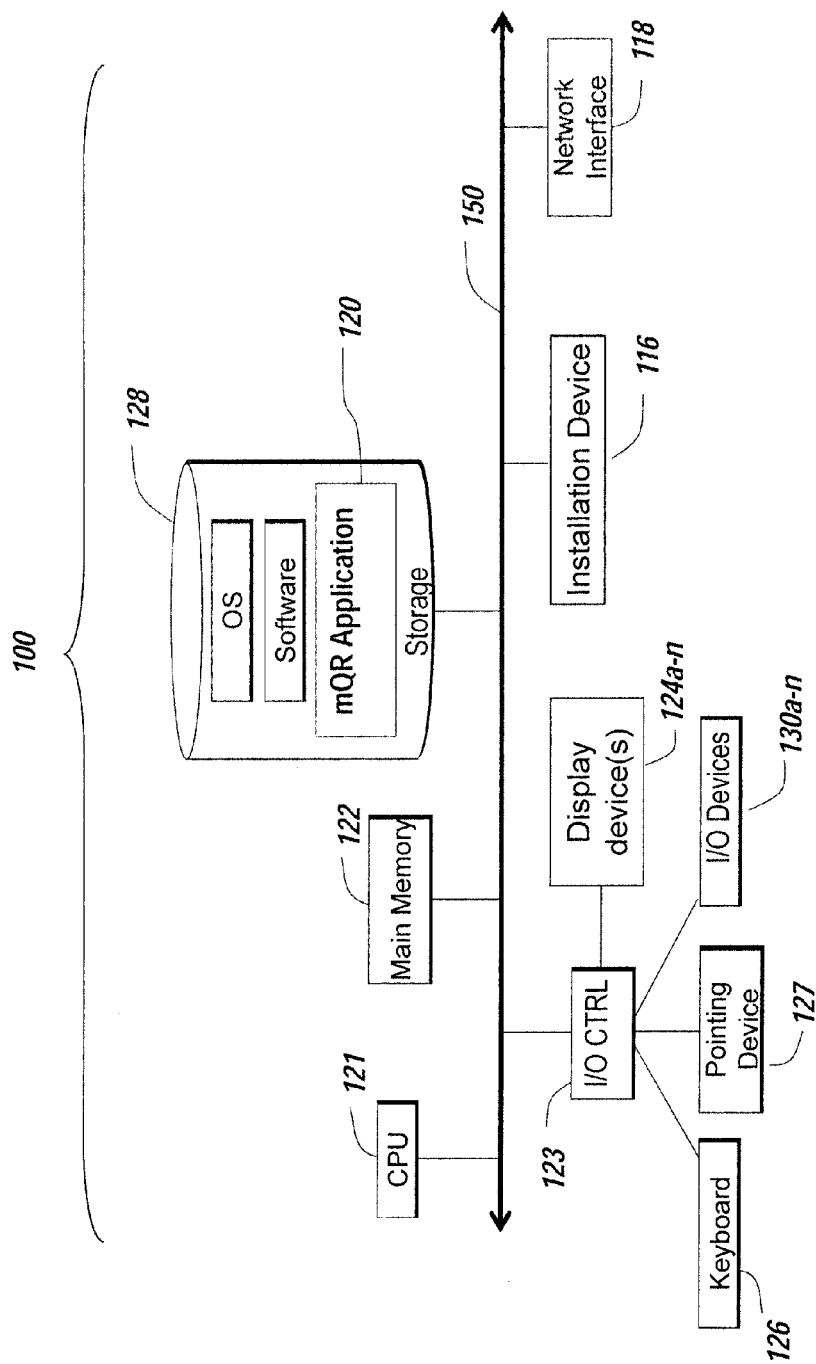
FIGS. 1C and 1D are block diagrams depicting embodiments of computing devices useful in connection with the methods and systems described herein in accordance with an implementation of the present disclosure.
Figure 1D:
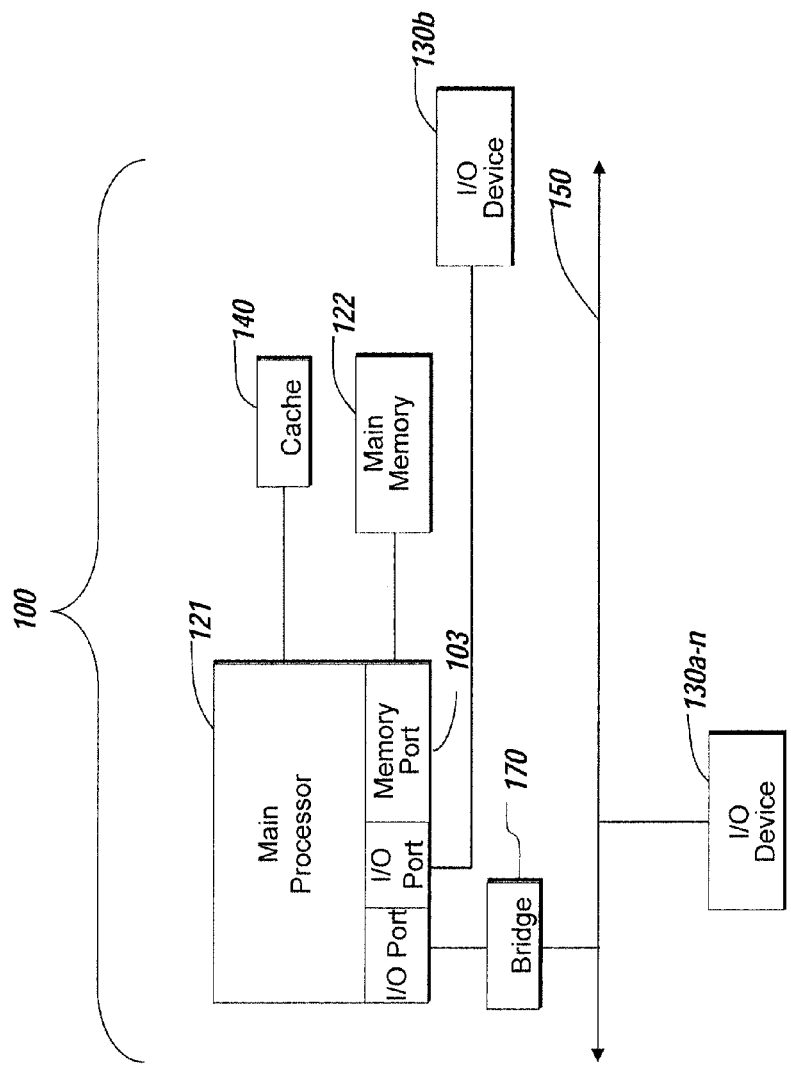

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of the mQR application 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (Fe-RAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the experiment tracker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESS-CARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Generating and Displaying Motion QR Codes

Referring now to FIGS. 2-5, the systems and methods of the architecture, process and implementation of a motion QR code will be described. In general, a motion QR code is a 2D code that is played as a motion picture of 2D codes or as a sequence of 2D codes over time. The motion QR code is encoded with a flow of data that is displayed, or "played", to sequentially reveal, display or otherwise visualize a plurality of 2D codes encoding such data. The 2D codes can include 2D barcodes, QR codes, Aztec codes, data matrix codes, or similar codes and are generically referred to as 2D codes. In comparison to a traditional 2D code, the motion QR code dramatically increases the amount of information encoded, carried and displayed. The QR motion codes can be displayed on, and scanned by, applications executing on client devices such as smartphones and tablet computers. The QR motion codes can be incorporated into IDs, certificates, tickets, passes, or other documents and management systems.

Figure 2:
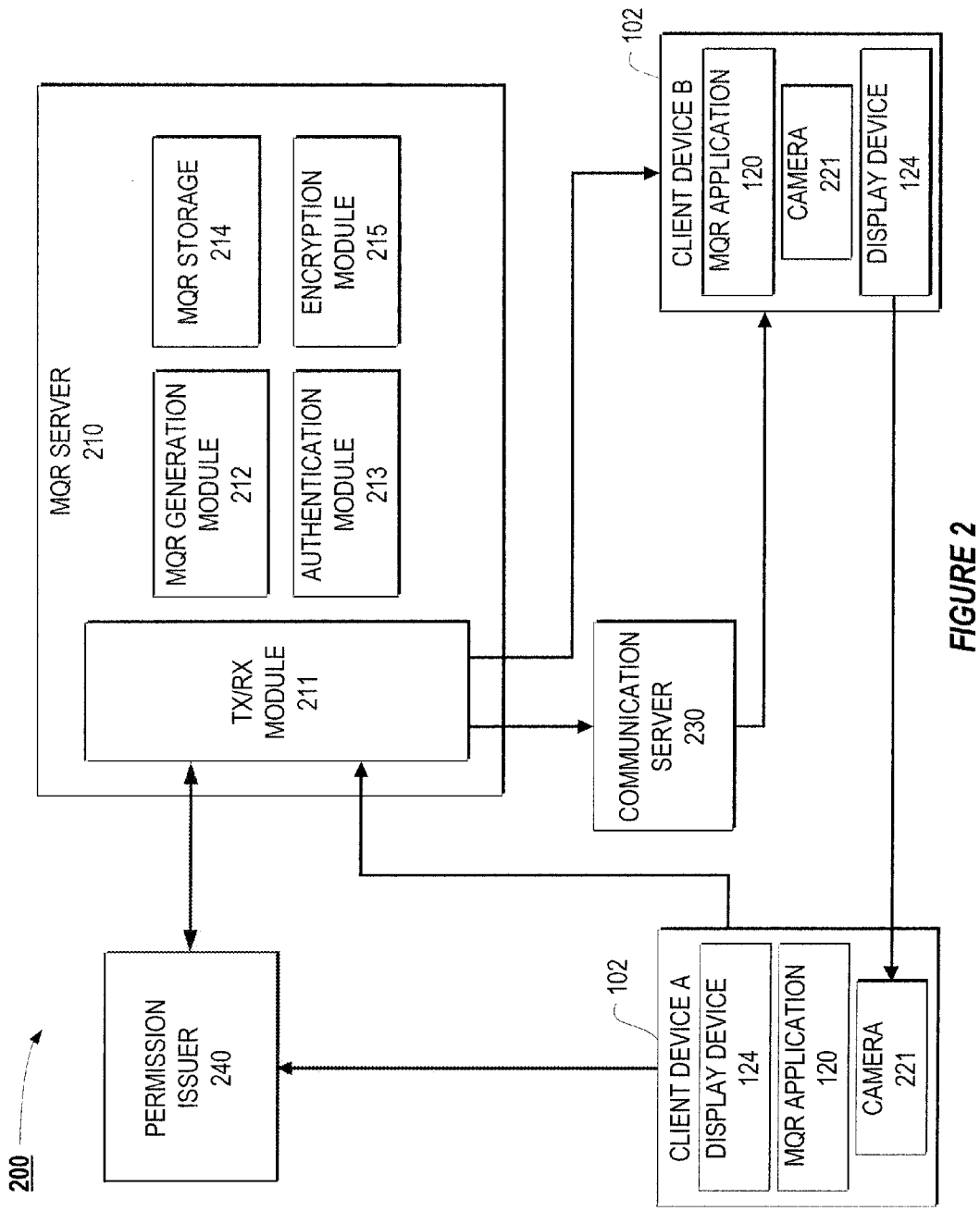
FIG. 2 is a block diagram of a system for generating and using motion QR (mQR) codes in accordance with an implementation of the present disclosure.

FIG. 2 is a block diagram of a system 200 for generating and using motion QR codes, sometimes also referred to as motion codes or mQR or mQR code. The system 200 includes a mQR server 210. The mQR server 210 includes a TX/RX module 211, a mQR generation module 212, an authentication module 213, a mQR storage 214, and an encryption module 215.

The system 200 also includes a plurality of client devices 102. Each client device 102 executes the above described mQR application 120. Each client device 102 may include a camera 221 for scanning or otherwise reading a QR code, such as a motion code, and a display device 124 for presenting or display a QR code, such as a motion code. The mQR server 210 communications with client device 120b directly or either indirectly through the communication server 230. The client device 120a is in communication with the mQR server 210 directly or either through a permission issuer 240. In some implementations, the client device 102b is referred to as the user client device 102 and the client device 102a is referred to as the issuer client device 102.

Each and/or any of the components of the mQR server 210 may include or be implemented as one or more applications, programs, libraries, scripts, services, processes, tasks and/or any type and form of executable instructions executing on one or more devices, such as any of the servers 210.

The mQR server 210 includes a transmit and receive (TX/RX) module 211 for sending and/or receiving communications, such as network packets, to/from other devices over one or more networks 104. In some implementations, the TX/RX module 211 is a network interface 118 or similar I/O port as described above in relation to FIG. 1C. Through the TX/RX module 211, the mQR server 210 sends data to and receives data from the various components of the system 200. For example, and as described below, the mQR server 210 uses the TX/RX module 211 to transmit mQR codes to the client device 120b. The TX/RX module 211 communicates with the components of the system 200 through a network, such as the above described network 104. For example, the mQR server 210 may communicate with the components of the system 200 over a local area network (LAN), a wide area network (WAN), wireless area network, intranets, and other communication networks such as mobile telephone networks, the Internet, or a combination thereof.

The mQR server 210 also includes a mQR generation module 212. The mQR generation module 212 is configured to create, generate or otherwise provide mQR codes that encodes one or more data items, such as a flow of data requested by a requestor. Generally, a mQR code can be referred to in two forms. The data form, such as the form transmitted between devices, may be referred to as a mQR byte array. The display form, such as the visual presentation of the data form, may be referred to as the mQR code. The term "mQR code" may be used herein to describe the mQR byte array in its data form and/or the mQR code in its displayed form.

The mQR generation module 212 is configured to receive a request to generate a mQR code and generates the mQR code responsive to the request. In some implementations, the request is received from the permission issuer 240, or another component of the system 200. The request includes data or a flow of data (e.g., content) that is to be encoded by the mQR generation module 212 to become the generated mQR code. The mQR generation module 212 generates the mQR code as a byte array, which is later displayed by a client 102. The mQR byte array is described further in relation to FIG. 3A. In general, the mQR generation module 212 arranges the data of the mQR code into a series or sequence of a plurality of 2D codes. In some implementations, the mQR generation module 212 also includes a mask, display frequency, permissions data, or any other information for the subsequent display or visualization of the mQR code as further described herein.

The mQR server 210 also includes an authentication module 213. In some implementation, the authentication module is configured to authenticate a user and/or device of the user. The authentication module may be configured to use one-factor or two-factor authentication. In some embodiments, the authentication module uses biometric information of a user to authenticate the user. The authentication module may communicate with one or more other servers to authenticate a user and/or device of the user.

In some implementations, the authentication module 213 is configured to authenticate the mQR code. In some implementations, the authentication module 213 digitally signs with a digital signature the mQR byte array after the byte array is generated by the mQR generation module 212. For example, the byte array generated by the mQR generation module may be signed with a private signature. Signing the mQR byte array by the authentication module 213 enables the other components of the system 200 to determine the authenticity of the mQR byte array when they receive the mQR byte array. For example, an mQR application 120 executing on a client 102 may be configured to convert the mQR byte array into an mQR code for display only if the mQR byte array is signed with an acceptable digital signature and its authenticity is verified. Likewise, the authentication module may verify the authenticity of an mQR byte array or data flow that is received by or presented to the mQR server based on the digital signature.

The mQR server 210 may also include an encryption module 215 for encrypting the mQR code, such as the byte array, and any portion of communications herein and for decrypting the same. The encryption module may be configured to perform asymmetric or symmetric encryption and/or decryption. Although generally the encryption module is referred to as encrypting the encryption module may be designed and constructed to perform both encryption and decryption. The encryption module may encrypt the item to be encrypted, such as the byte array of the mQR code, using a private key that the encryption module stores and/or maintains for decryption. The encryption module may decrypt using the private key any item that the encryption module has encrypted. The mQR server 210 can be configured to encrypt the mQR byte array before the byte array is transmitted to a client 102. In some implementations, the encryption module 215 encrypts the bye array for storage in the mQR storage 214. In another implementation, the encryption module 215 is involved in encrypting the communications between the mQR server 210 and the various components of the system 200. For example, the encryption module 215 may manage a secure communication protocols, for example, Secure Socket Layer, Transport Layer Security or Secure HyperText Transfer Protocol (HTTPS), connection to the client 102b for the delivery of a mQR code byte code array to the client 102b.

The mQR server 210 also includes a mQR storage 214. In some implementations, the mQR storage 214 is similar to the above described storage device 128. In some implementations, the mQR server 210 maintains a record of the mQR codes that the mQR server generates and distributes to any type and form of database. For example, after generating and delivering a mQR code to a client 102, the mQR server 210 may save the mQR code and/or any information related to the mQR code into the mQR storage 214 comprising a database. The mQR server may track the usage and/or activity of the mQR code to the database in storage. When the client device 102 attempts to use the mQR code, the mQR code is authenticated with the mQR server 210. The mQR server 210 may ensure that a copy of the mQR code is saved in the mQR storage 214 before further processing the mQR code. In some implementations, the mQR server 210 may verify the mQR code has not been used before by referencing the mQR storage 214. For example, assume that the mQR is used as a concert ticket. When the guest presents his ticket at the gate, the mQR is processed with the system 200 by the concert attendant. The mQR server 210 may then indicate to the attendant that the mQR code is valid and has not been used before. The mQR server 210 may then save an indication that the mQR code has been used in association with the mQR code saved in the mQR storage 214. If a second user later attempts to use the same mQR code, the mQR server 210 may indicate to the attendant that the mQR code was previously used. In some implementations, the mQR codes stored in the mQR storage 214 are deleted from the mQR storage 214. The deletion of mQR codes from the mQR storage 214 may be done at predetermined intervals (e.g., mQR codes older may be phased out after 30 days) or the mQR codes may be deleted after they are indicated as being used.

The system 200 also includes a communication server 230. The communication server 230 is a server or similar device that is configured to perform or handle communications between the mQR server and any client devices. As described below, an issuer of a mQR code can select to have the mQR server 210 send the mQR code directly to a client 102 or the issuer may request that the mQR code be "pushed" to the client 102, such via a push communication channel. In some implementations, the communication server 230 is a push server. For example, the communication server 230 may be a push server using the HTTP server push protocol, long polling, Flash XML socket relays, or similar push protocols. In some implementations, the communication server 230 may be a push server maintained by third party—for example, the Apple Push Notification Service or the Android Cloud to Device Messaging Service. In some implementations, transmitting a mQR byte array to the client 102b through the communication server 230 enables the mQR server 210 to determine that the mQR server 210 is addressing a valid client 102 and not another entity masking itself as a valid client 102.

The system 200 also includes a plurality of client devices 102. The clients 102 illustrated in relation to system 200 are similar to the clients 102 described above in relationship to FIGS. 1A and 1B. Each client 102 includes one or more processors to execute the mQR application 120. A mQR code transaction typically includes a first client 102 on the issuer side of the transaction and a second client 102 on the user side of the transaction. In some implementations, the mQR application 120 executed by each of the clients 102 is capable of performing the functions described herein on either side of the transaction. In other implementations, the user client 102 executes a user mQR application 120 and the issuer client 102 executes an issuer mQR application 120.

As an overview, the mQR application 120 is configured to receive, process and/or handle the motion codes of the present solution. The mQR application may receive a mQR code from the mQR server 210. The mQR code may be received as a mQR byte array. The mQR application is designed, constructed and/or configured to understand, interpret and process the structure, format and/or information carried by and/or stored via the mQR byte array. The mQR application 120 process and/or translates the mQR byte array into a visualization of the mQR code that is displayed via the display 124. The application may be configured to display the series, sequence or motion picture of the plurality of 2D codes of the mQR code at a predetermined frequency between about 1 frame/second to about 40 frames/second. The application may be configured to display the series, sequence or motion picture of the plurality of 2D codes of the mQR code through a predetermined number of loops, such as 1, 2, 3 or N times. The application may be configured to display the series, sequence or motion picture of the plurality of 2D codes of the mQR code continuously until a predetermined event, such as a user requesting the application to stop displaying the mQR code or receiving an indication that the mQR code was scanned or read.

The clients 102 may include a camera 221, such as to scan or read any codes, 2D codes or motion codes. On the issuer side of the transaction, the client 102 uses the display 124 and camera to scan a displayed mQR code. The application on the client that scans the mQR code, may translate, decode or otherwise generate the byte array that corresponds to the mQR code. The byte array may be forwarded to the mQR server 210 for authentication and/or further processing.

The system 200 also includes a permission issuer 240. In some implementations, the permission issuer 240 is a server or other computing device owned or operated by the entity that requests the mQR code be issued. For example, the permission issuer 240 may be a ticket agent or similar entity that issues tickets to users. The permission issuer 240 is in communication with the mQR server 210. The permission issuer 240 sends mQR requests to the mQR server 210. As described below, the mQR server 210 then generates the mQR responsive to the request. In some implementations, the requests can include content, a desired method of delivery, and a recipient (e.g., an email address or phone number of the recipient). In some implementations, the permission issuer 240 provides the authentication module 213 of the mQR server 210 with the private signature key with which the mQR code data array is signed.

In some implementations, the request to generate a mQR code comes from a third party. For example, the request may come from a distributer of tickets. In these implementations, the third party may transmit the request to the mQR server 210. Realizing the request is from a third party, the mQR server 210 may then forward the request to the permission issuer 240 for authorization. Responsive to receiving authorization from the permission issuer 240, the mQR server 210 may then generate and transmit the mQR code responsive the request form the third party.

In some implementations, the system may include a client device and application on the client for the issuer or a controller or entity controlling access or use of the mQR code of the issuer. The issuer or controller client 102a scans a mQR code and then sends an indication of the scanned mQR code directly to the mQR server 210. In other implementations, the clients 102a sends the indication to the permission issuer 240, which then forwards the indication (or other data) to the mQR server 210. The indication sent to the mQR server 210 or the permission issuer 240 can be a scan log. The scan log can include information relating the scan of the mQR code. For example, the scan log can indicate when and where the mQR was scanned, who scanned the mQR code, the user of the mQR code, event or other ticket information, time stamp information, or any combination thereof. In some implementations, if the indication is sent directly to the mQR server 210, the mQR server 210 may forward a log or other report back to the permission issuer 240, to indicate that a mQR code was used.

Figure 3A:
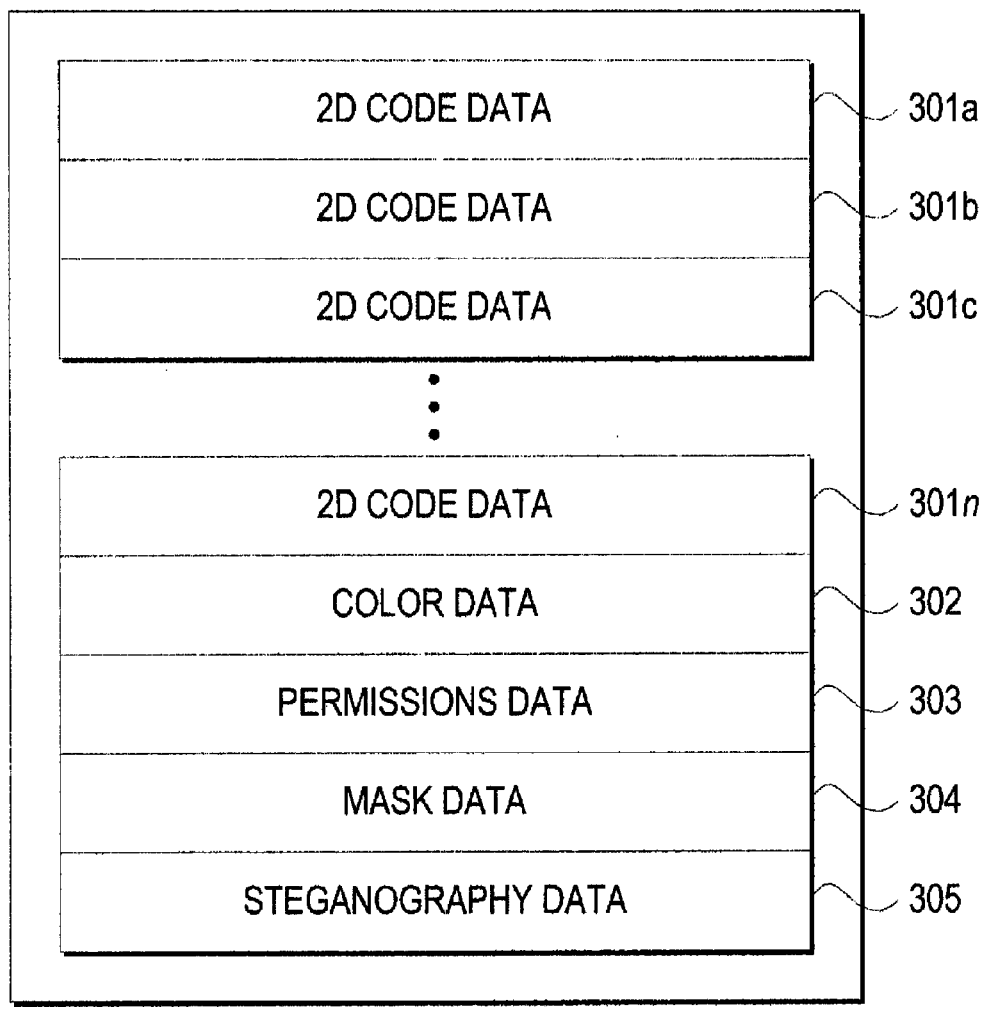
FIG. 3A is a block diagram illustrating a mQR byte array in accordance with an implementation of the present disclosure.

FIG. 3A is a block diagram illustrating a mQR byte array 300. A mQR byte array is the data that is used to represent, generate (display) or otherwise provide a mQR code. The mQR byte array 300 includes a plurality of data items. The array 300 includes data items representing or provide a plurality of 2D codes 301. The mQR byte array 300 may also include a color data item to represent color 302, a permissions data item to represent permissions 303, a mask data item 304 to represent a mask. In some implementations, the mQR byte array may include a steganography data item 305 to represent or provide a steganogram, such as a steganogram comprising an mQR code.

The mQR byte array 300 includes a plurality of data items representing or implementing a flow of data encoded by and to be delivered or provided via a sequence of 2D codes of the mQR code and/or information for generating and displaying or visualizing the mQR code. When displayed, an mQR code is displayed as a series of QR codes. Each of the 2D code data items 301 represent the data encoded in each of the series of QR codes. Each of the 2D code data items 301 includes a flow of data that is used to generate one of the QR codes (e.g., frames) of the mQR code. As described below in relation to FIG. 4, in some implementations, the data flows from the request into each of the 2D code data items 301 in a non-sequential manner. For example, a first portion of the data may flow into the 2D code data item 301c and a second portion of the data may flow into the 2D code data item 301a. As illustrated in FIG. 3A, the mQR byte array 300 includes n 2D code data items 301. The number of code data items 301 can be varied responsive to the amount of data that is to be transferred with the mQR code.

The color data item 302 is the data item for encoding or identifying one or more colors for the mQR. In some implementations, the mQR code is displayed in one or more colors. In some implementations, the mQR may change color responsive data within the permissions data item 303. For example, the mQR code may display as a first color and then display as a second color a predetermined amount of time before the mQR code is to be used. Furthering the example, the mQR code may turn from red to green when the "doors open" for a concert or when the client 102 is within a given distance of the concert hall.

Similarly, the mQR code may be displayed with a mask. A mask is an image that blocks or obfuscates a portion or the entirety of the mQR code. The data for the mask is stored, encoded or otherwise identified by the mask data item 304. A mask may be applied to an mQR code for security purposes or to ensure that the mQR code is only used at a predetermined time. The mask may cover a portion of the mQR code and prevent the entirety of the mQR code from being displayed until a predetermined amount of time. In some implementations, the mask blocks a portion or region of the mQR code responsive to the current time or location of the client 102 displaying the mQR code.

The mQR byte array 300 may also include a permissions data item 303 for the storage of the permissions associated with the mQR byte array 300. As described above, different colors and masks may be used to control the permissions of who, when (e.g., date or time) and where (e.g., place or location) an mQR code may be used. In some implementations, the data stored within the permissions data item 303 indicates to the mQR application 120 displaying the mQR code when an mQR code may be displayed. The data within the permissions data item 303 may be encrypted or digitally signed such that the mQR application 120 knows that the permissions and the array 300 have not been altered. In some implementations, the user is authenticated through one or two-factor authentication before the mQR code is displayed. The mQR application 120 may perform a hash on a password the user enters and then compare the hash to a hash saved in the permissions data item 303 to determine if the mQR code should be displayed. The mQR application may authenticate a user using passwords, finger prints, facial characteristics, DNA, or any combination thereof.

The mQR byte array 300 may include a steganography data item 305. In some implementations, the mQR code is hidden within an image or video. The data for the images that hide the mQR code or otherwise provide the steganogram is stored in the steganography data item 305. In some implementations, the steganography data item 305 also stores audio data. The application 120 may play the audio data when displaying the mQR code 300 in a manner where the audio signal is not perceivable to the human ear. For example, the audio signal may be an additional way in which the mQR code is authenticated.

In some implementations, the mQR byte array 300 includes a frequency data item. In other implementations, the frequency data item may be coded or configured into the executable instructions of the application 120. The data at the frequency data item indicates at what speed the 2D QR codes should be displayed in visualization the mQR code. In some implementations, the display frequency of the mQR code is between about 1 frame/second to about 40 frames/second. In some implementations, the frequency data item includes a plurality of frequencies. In these implementations, the display frequency of the mQR code may dynamically update as the application displays the mQR code.

The mQR byte array 300 may also include instruction data items related to the generation and visualization of the mQR code on the client device 102. For example, the mQR byte array 300 may include information such as mQR code display size, length or number of times the mQR code is to be displayed, header information that indicates the location of the above described data items within the mQR byte array 300, or any combination thereof.

Figure 3B:
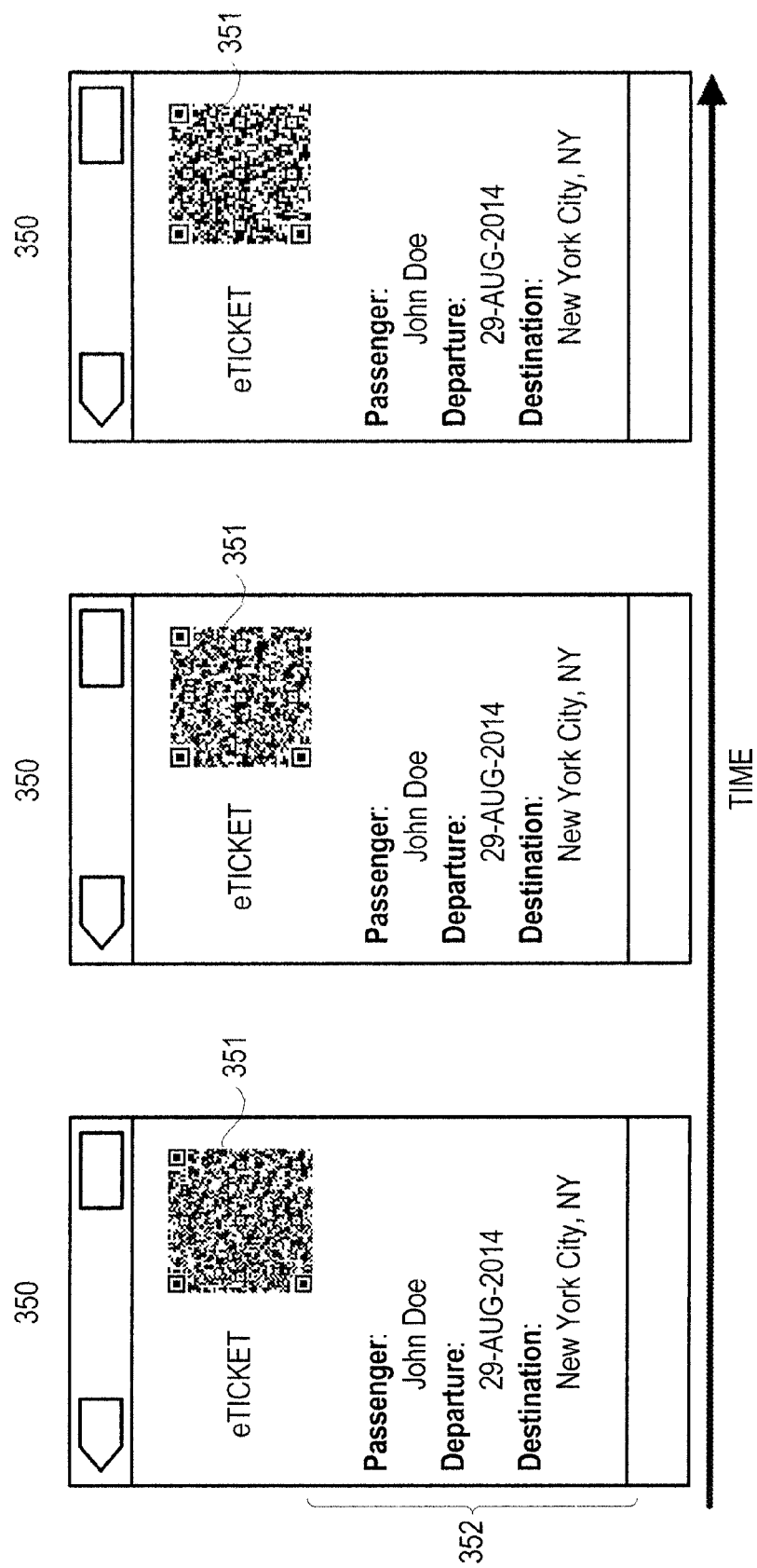
FIG. 3B illustrates a mQR code embedded in an eTicket in accordance with an implementation of the present disclosure.

FIG. 3B illustrates a mQR code embedded in an eTicket 350 over time. The eTicket 350 is displayed on the video display 124 by the mQR application 120 executing on a client 102. As illustrated the mQR code 351 is a component of an eTicket 350. The eTicket 350 also includes a human readable section 352, which displays human readable information to a user or issuer. The placement of the mQR code 351 and the configuration of the eTicket 350 may be designed to provide a user with a safe, empiric sensation. For example, the eTicket 350 may resemble an eTicket that the user has used in the past and feel comfortable using. In some implementations, the mQR code 351 may remain still until a predetermined time or until the mQR application 120 is at a predetermined location. For example, when a user views the eTicket 350 the mQR code 351 on the message viewing applications 350 may remain stationary. However, when the user approaches the location where the eTicket 350 is to be used—for example a train station—the mQR code 351 may become animated or otherwise move through the series or sequence of 2D codes at the display frequency.

Figure 4:
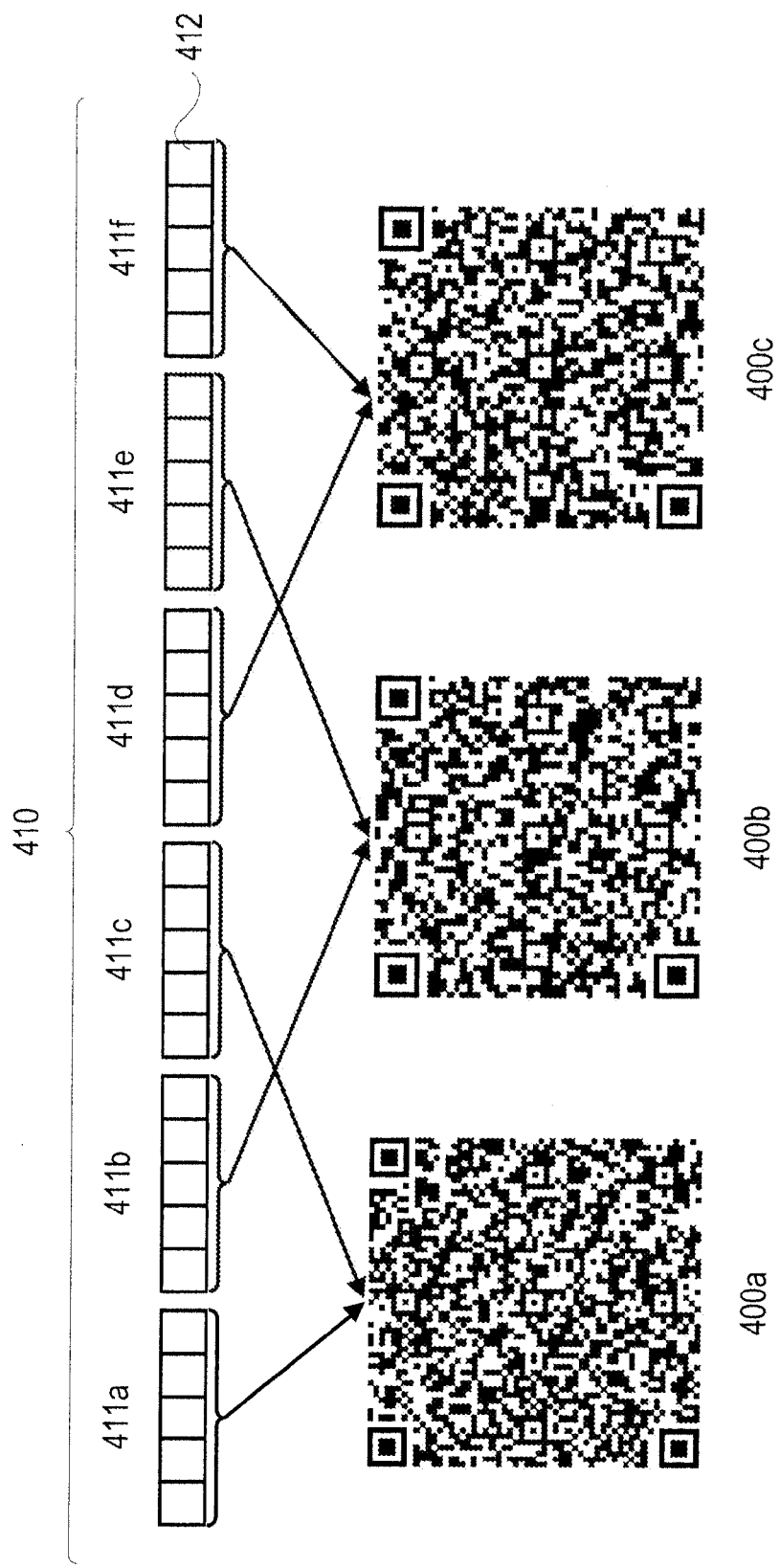
FIG. 4 illustrates a mQR byte array and the mQR code generated with the byte array in accordance with an implementation of the present disclosure.

FIG. 4 illustrates a mQR byte array 410 and the mQR code 400 generated with the byte array 410. As described above in relation to FIG. 3A, the array 410 includes a plurality of 2D code data items 411a-f. For illustrative purposes the other data item types are omitted from the array 410 illustrated in FIG. 4. FIG. 4 illustrates that the six 2D code data items 411a-f, each of which contain a plurality of bytes 412, produce three frames of the mQR code 400 when displayed by the application. In some implementations, the 2D code data items 411 do not sequentially generate the frames of the mQR code 400. For example, the code data items 411a and code data items 411c are combined by the application 120 to produce the first frame of the mQR code 400. Similarly, the second frame of the mQR code 400 is produced from the second and fifth code data items 411.

In some implementations, the non-sequential encoding of the array 410 provides an extra layer of security. For example, if the data was sequentially displayed then a third party viewing the display of the mQR could possibly collect and decode the data transmitted by the mQR code 400. However, if the mQR code 400 is generated with non-sequential byte array 410, then if a third party intercepts the mQR code 400, they will be unable to create the data because they do not in what order to place the bytes decoded from the mQR code 400.

Figure 5:
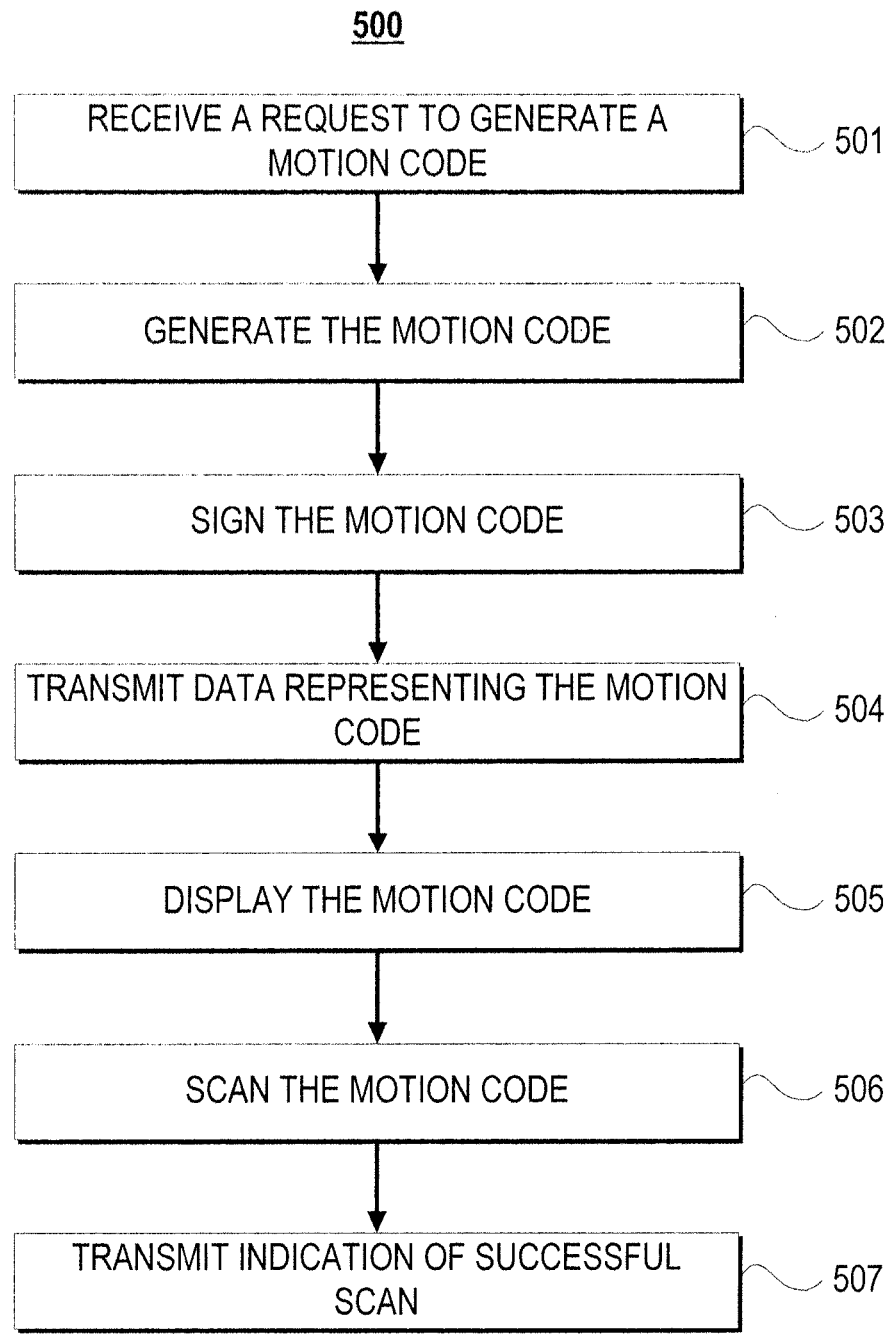
FIG. 5 illustrates a block diagram of a method for generating and displaying a mQR code byte array in accordance with an implementation of the present disclosure.

FIG. 5 illustrates a block diagram of a method 500 for generating and displaying a mQR code. In brief overview, the method 500 includes receiving a request to generate a mQR code (step 501). The mQR code is generated by a server (step 502). The mQR code is digitally signed by the server (step 503). The server transmits the mQR code to a client (step 504). The client displays the mQR code (step 505), which is scanned by a client of the issuer (step 506). An indication of a successful scan is sent to the server (step 507).

In further details of step 501, the mQR server receives a request to generate a mQR code. The request may comprise a request to generate data flow to be displayed via the mQR code. The request may identify any combination (i) data to be encoded in the data flow, (ii) the method of delivery the assembled byte array to the client device, and/or (iii) the information necessary to identify the client and the client device In some implementations, the request comes from an issuer that is located remotely from the server that receives the request. For example, the issuer may be a venue that is selling tickets for a concert that is going to be held at the venue. The request can include data the issuer wishes to be included in the mQR code, such as, but not limited to, ticket information, seating information, user information, or any combination thereof. The request can also include an indication of how the issuer wishes the mQR code to be delivered to the recipient of the mQR code. For example, the issuer may request the mQR code be delivered to the recipient through a secure channel using the above described communication server 230, by email, by text message, or by a similar messaging service. The request can also include permissions information. For example, the request may include a hashed password or other security feature to ensure that only a valid recipient of the mQR code is able to display the mQR code. The permission information may also include masking data, times, locations, and other conditions under which the mQR code may be displayed.

At step 502, the server generates the mQR code. The mQR server may generate the byte array of the mQR code using the data and information from the request, such as by encoding a flow of data from the request into the sequence of 2D codes of the mQR code. In some implementations, the server collects the information from the issuer and encodes the data into the mQR byte array. In some implementations, the server encodes and packages the data in a format similar to that described above in relation to FIGS. 3A and 4. The server may also encode other information necessary for the visualization the mQR code into the mQR byte array. For example, the server may include specific colors for the display of the mQR code or a specific frequency at which the mQR code is to be displayed. In some implementations, the server also encrypts the mQR byte array or includes other security features into the byte array such as stenography data.

At step 503, the server digitally signs the mQR byte array. The server may sign the encoded mQR byte code array with a private signature key. In some implementations, the private signature key is provided by the issuer. By signing the mQR byte array, a client receiving the mQR byte array can determine that the mQR byte array is authentic and was delivered from a valid server.

At step 504, the mQR byte array is transmitted. The server transmits the mQR byte array to the client device. As described above in relation to FIG. 2, the server may transmit the mQR byte array to the client directly or through a secure push server, such as the communication server 230. As described above, the method of transmission can be determined by the issuer in the request of step 501. In some implementations, the mQR byte array is pushed by the communication server 230 directly to the mQR application 120 executing on the client 102. In other implementations, the server delivers the mQR byte array to the client device through a third party application. For example, the server may deliver the mQR byte array through email or a text message. The user may then click on an attachment or link in the email to open the mQR code in the mQR application 120.

At step 505, the mQR code is displayed by the client. The client receives the mQR code as a mQR byte array. When a user wishes to display the mQR code, the user launches the mQR code application on the client. The application then decodes the mQR code array and generates a visualization of the mQR code for display. Decoding can include generating the plurality of 2D QR codes that form the mQR code and applying the appropriate masks, colors, or other security features as are encoded in the mQR byte code array. Responsive to decoding the mQR byte array into a mQR code, the client device, such as via the application, displays the mQR code. In some implementations, the mQR code is played through a predetermined number of times. In other implementations, the application continues to display the mQR code in a continuous manor until the mQR code is successful scanned or the user quits the application. The server may provide the client with an indication when the displayed mQR code has successfully been scanned.

At step 506, the displayed mQR code is scanned. As the client device displays the mQR code, the mQR code may be scanned by an issuer or controller client device. The issuer or controller client device may be a smart phone or tablet with a camera. Using the camera, the issuer client may scan or record the mQR code displayed on the client. Responsive to scanning (or recording) the mQR code, the issuer or controller client re-encodes the mQR code into a mQR byte array.

The mQR byte array may be transmitted to the permission issuer or to the mQR server for authentication. For example, the issuer or controller client may transmit the re-encoded byte array to the server to determine if the mQR code has been used before. In some implementations, the issuer or controller client may transmit an indication of the re-encoded byte array. For example, the issuer or controller client may transmit a hash of the re-encoded byte array to the permission issuer or the server for authentication. In some implementations, the issuer or controller client is loaded with indications of mQR codes from the mQR storage 214, such that the issuer client can authenticate mQR codes without reconnecting to the permission issuer or the server. For example, if an event is to be held in a remote location with poor network connectivity, the issuer or controller client may download an indication of the mQR codes (tickets) that were sold for the event. The mQR codes may then be verified at the event without the issuer or controller client having to reconnect to the server. At a later point in time, such as when the issuer or controller client reestablishes a network connection, the issuer or controller client may transmit an indication of the scanned mQR codes to the permission issuer and/or server.

At step 507, when the mQR code is successfully scanned by the issuer client, the application scanning the mQR code on the issuer client generates an indication that the mQR code was scanned. The indication may be a log of the scan result or a similar data structure that is transmitted to the permission issuer and/or server when a successful scan has been made. In some implementations, the application on the issuer or controller client also generates a local indication for the user of the issuer or controller client. For example, the application may generate an audible tone or flash. The indication alerts the users of the issuer client and the user client that the mQR code was successfully scanned. Additionally, the application on the issuer or controller client may provide a negative indication if a mQR code is not successfully read after a predetermined number of attempts or amount of time.

C. Systems and Methods for an Issuer Certified Card

Figure 6:
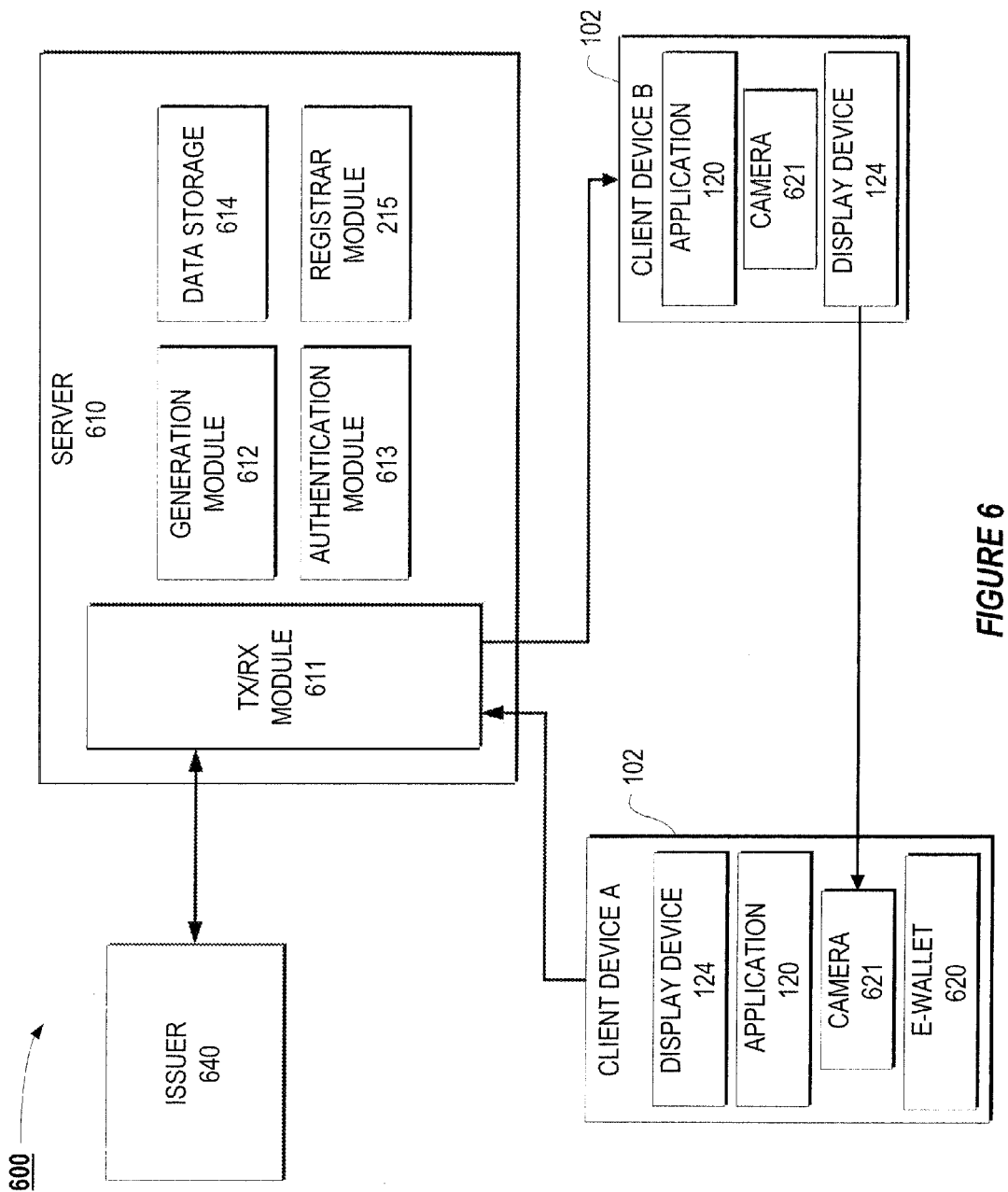
FIG. 6 illustrates a block diagram of a system for registering cards of a card holder in accordance with an implementation of the present disclosure.
Figure 7:
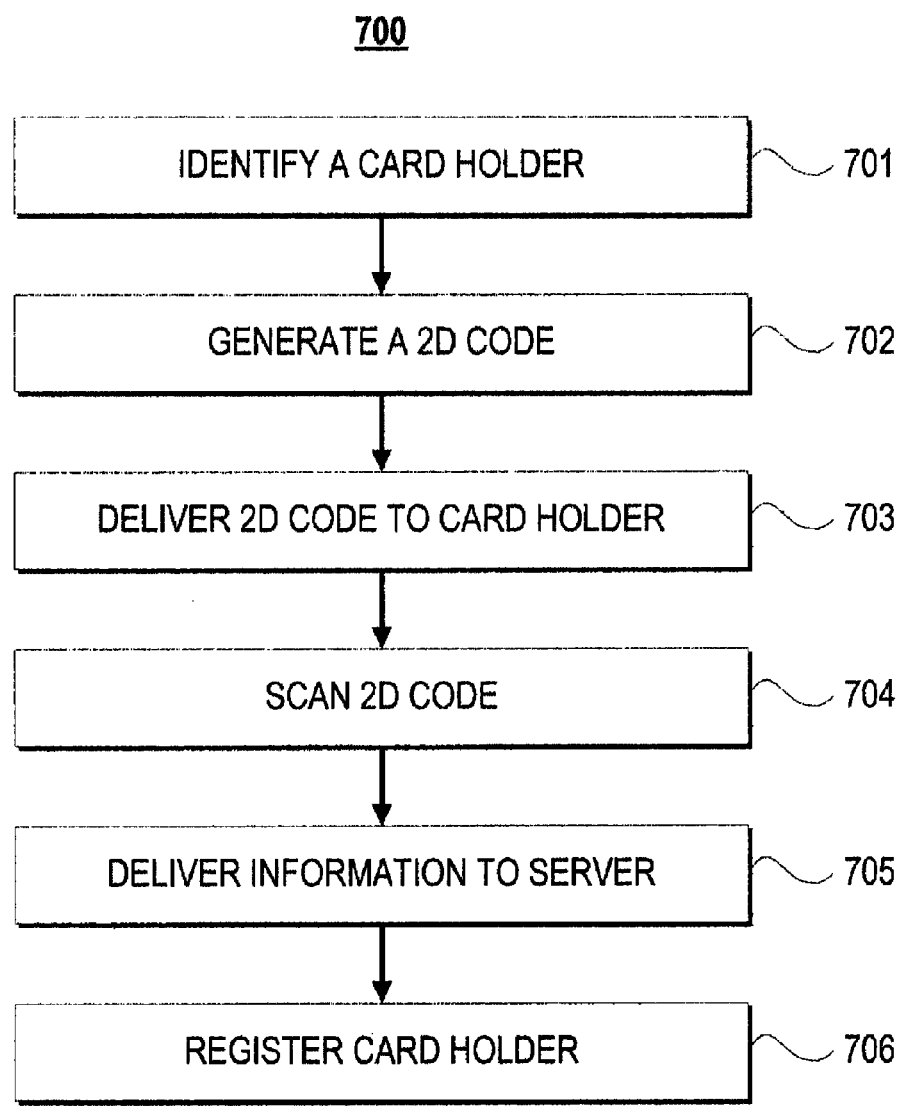
FIG. 7 illustrates is a flow diagram of a method for providing registration for the card of a card holder in accordance with an implementation of the present disclosure.

Referring now to FIGS. 6 and 7, the systems and methods for providing registration of a card of a card holder via a two-dimensional code are described. The system and methods described herein enable mobile phones (or similar mobile computing environments) to register banking cards, loyalty cards, club cards, reward cards, or any combination thereof in a fast and safe manner. In some implementations, the user may also wish to register their cards (e.g., credit cards) with an e-wallet application on their mobile devices, such that the user may use the card from the mobile device.

As an overview, a user may apply for a card or for a service that is associated with a card. For example, the user may sign up for a new bank account, which includes a linked banking card. The bank may deliver to the user (e.g. card holder) the card and a 2D code encoded with registration information for the card holder to register the card and/or register for a service associated with the card. In order to register the card, the card holder scans the provided 2D code. Scanning the 2D code with the application described herein transmits registration information to the server to register the card. All, or part, of the registration information transmitted to the server may be encoded with asymmetric encryption. Responsive to the received registration information, the server identifies and authenticates the card and card holder associated with the registration information. Responsive to a successful authentication, the system registers the card, such as for the card holder to use services of the issuer. In some cases, the issuer may activate the card as part of or responsive to registration. In some cases, the issuer may process access to a service, such as online card account management, associated with the card as part of or responsive to registration.

FIG. 6 illustrates a block diagram of a system 600 for registering cards of a card holder. The system includes a server 610 for implementing registration of cards of card holders using 2D codes or motion codes. The server 610 includes a TX/RX module 611, a code generation module 612, an authentication module 613, a storage device 614, and a registrar module 615. The system 600 also includes a plurality of client devices 102. Each client device 102 may execute an implementation of the above described application 120. Each client device 102 may include a camera 621 for scanning or otherwise reading a 2D code and a display device 124 for presenting or displaying a QR code. The system 600 also includes an issuer server 640 for providing and/or authenticating registration information of a card holder.

In some embodiments, the server 610 and any of its components may be implemented or deployed as part of the issuer server 640. For example, the issuer may implement the systems and methods described herein to deploy a 2D code based registration system for card holders. In some embodiments, the server 610 may be implemented or deployed by a registration service that registers cards on behalf of the issuer or implements a registration process using 2D codes for the issuer.

Although the systems and methods described in connection with FIGS. 6 and 7 may be described using 2D codes, implementations of these systems and methods may use any embodiments of the mQR or motion codes described in connection with FIGS. 2-5. In some implementations, the server 610 may include any of the components described in relation to any of the mQR servers described herein, such as in connection with FIGS. 2-5.

As described above in relation to FIG. 2, the server 610 includes a transmit and receive (TX/RX) module 611 for sending and/or receiving communications, such as network packets, to/from other devices over one or more networks 104. The server 610 may transmit 2D codes or motions codes via the TX/RX module to user devices, such as devices of card holders or to the others servers, such as a communication server. For example, responsive to generating a 2D code, the server 610 may transmit the generated 2D code to a client device 102 for display and eventual scan by another client device 102. In some implementations, the 2D code for registering a card may be sent to the user through a means outside of the network 104. For example, after registering for a service, the system 600 may send the 2D code to the user through a postal service. The 2D code may be mailed in a welcoming packet sent to the user after the service associated with the card is opened. The server 610 may receive 2D codes or motions codes, or any data encoded in such codes, via the TX/RX module from user devices, such as from devices of card holders or from others servers.

The server via the TX/RX module may establish secure communication channels or connections with any other device, such as a device of the card holder. The server may send the 2D code and/or receive content from a scan of the 2D code over such secure communication channels. In some implementations, the server may communicate with a device of a card holder, via a communication server 230 as described in connection with FIG. 2.

The server also includes a code generation module 612. The code generation module 612 is configured to create, generate or otherwise provide 2D codes that encode one or more data items, such as data for the registration information. The code generation module 612 can be configured to receive registration information from the issuer 640 and generate 2D codes responsive to receiving the registration information. The request can include data or a flow of data (e.g., content) that is to be encoded by the code generation module 612 into the generated 2D code. In some implementations, the content that is encoded into the 2D code is received, at least in part, from the user (e.g., card holder). The code generation module 612 may include part or all of the received registration information in the encoded 2D code. The generated 2D code may be 2D barcodes, QR codes, Aztec codes, data matrix codes, embodiments of the motion code or mQR code described herein, or any combination thereof. As described above, the 2D code may be generated as a byte array, which is later displayed by a client 102 as a 2D code. In other implementations, the code generation module 612 may generate a physical 2D code (e.g., a printed 2D code) that is delivered physically to the user, such as by mail.

In some implementations, the code generation module 612 encrypts the generated 2D code or a portion of the data included in the 2D code. The code generation module 612 may encrypt the 2D codes using asymmetric or symmetric encryption. The data of the 2D code may be encrypted using a private key that the code generation module 612 stores and/or maintains for decryption.

The generation module 612 may also decrypt, using the private key, any data items from the 2D code that the server 610 receives which are encrypted. In some implementations, the code server 610 includes a separate encryption module like the above described encryption module 215 for handling encryption and/or decryption of data.

The issuer may provide to the server and the server via the code generator may encode into 2D codes various implementations of registration information. The registration information may include information to register any type and form of card, such as a bank card, a loyalty card, a rewards card, a points card, an advantage card or a club card. The registration information may comprise any type of data one may find or obtain for a physical card of the card holder, such as name, account identifier or number, date of expiration, issuer identification, such as name or contact information, and any security features, such as a credit card validation (CCV) number, and any data encoded on the magnetic strip or circuitry of the card. The registration information may comprise any type of data associated with or included as part of an account of the card holder in connection with the card, such as contact information (address, phone number, etc.) for home and/or work, emergency or backup contact information and personal information such as birth date, social security number, etc. The registration information may comprise a pin or code that the issuer assigned to the card holder for the card, such as a pin to access an ATM machine or make a debit payment at a point of sale. The registration information may comprise information on user's credit history, such as other accounts of card holder or past residences of card holder. The registration information may comprise any information that the issuer may select to authenticate the user, such as authenticating the user via third-party services in which information on user's credit history, amount of payments or credit allocated and/or residences are verified.

In some aspects, the card or associated registration information thereof to be registered may be considered to have human viewable data and data that is invisible to a human user. For example, a user's name and credit card number may be printed on the front of the user's credit card. The user's came and credit card number may be considered human viewable data. The card may be an integrated circuit card (ICC or "smart card") and include an integrated circuit or magnetic strip on which data that the user cannot view is stored, which may be called or considered "invisible" data. The code generation module may encrypt the invisible data and leave unencrypted the visible data for the 2D code. In some implementations, the code generation module may encrypt both visible and invisible data onto the 2D code. In some implementations, the code generation module may choose not to encrypt or leave unencrypted some or portions of the invisible data.

The server 610 may include an authentication module 613. In some implementations, the authentication module 610 is configured to authenticate a user and/or device of the user. The authentication module 610 may be configured to use one-factor or two-factor authentication to authenticate the user. In some embodiments, the authentication module 610 uses biometric information of a user to authenticate the user. In some implementations, the authentication module 613 authenticates the user prior to the generation of the 2D code. For example, having received a card, the user may log into a website to register the card. The user may provide to the authentication module 613 information, such as a password or pin. If the authentication module 613 determines the presented password or pin are correct, the authentication module 613 may enable the code generation module 612 to generate a 2D code of the registration information to provide to the user. The user can then scan the presented 2D code to register the card via the server. In other implementations, the authentication module 613 authenticates the user after the generation of the 2D code, but prior to the registration of the card. For example, the user may be sent a new bank card in the mail. A 2D code may be enclosed with the new bank card. After scanning the 2D code, the application 120 may request the user to enter a PIN to confirm the user is the owner of the card. Authentication of the user just prior to registration of the card helps to ensure that the 2D code was not intercepted by a third party during delivery. In a situation where the 2D code was intercepted, if an unintended recipient attempted to scan the card, the unintended recipient would be presented with a request for a password, PIN, or biometric authentication. Not able to resent the required identification, the authentication module would not allow the registration of the card.

The server 610 may include a storage module 614. In some implementations, the storage module 614 is the above described storage device 128. In some implementations, the server 610 maintains a record of the 2D codes that the server generates and distributes using any type or form of database stored in the storage module 614. For example, upon or responsive to generating and delivering a 2D code to a client 102, the server 610 may save the registration information and 2D code in the storage module 614. The server 610 may track and save the usage and/or activity of the 2D code in the storage module 614. The server 610 may upon decoding and verification of registration information from a 2D code, store the registration information and any visible and any invisible data for the card of the card holder for subsequent utilization by the server and/or card holder.

In some implementations, the server 610 may verify the 2D code has not been used before by referencing the storage module 614. In some implementations, as a safety feature, the 2D code can be saved into the storage module 614 in association with a "valid for" date. For example, the 2D code may be valid for the next 60 days or a specific range—for example, valid starting in 3 days and ending in 60. If by the end of the "valid for" date range, the card has not been registered, the 2D card may be voided, such that the user has to request a new 2D code to register the card.

The server 610 can also include a registrar module 615. The registrar module 615 may be configured to register a card of the card holder based on registration information received for a card holder, such as registration information from data encoded onto the 2D code. The registrar module may decode and verify unencrypted received from a scan of the 2D code. The registrar module may decrypt encrypted portions of the data received from a scan of the 2D code and decode and verify such decrypted data. The registrar module may decode and verify unencrypted data received from a scan of the 2D code. The registrar module may verify or validate the registration information or a portion thereof with a third party, such as the issuer via server of issuer 640. For example, upon receiving registration information from the user's client device 102, the registrar module 615 may forward a portion of the information to the issuer 640. For example, the server 610 may receive registration information form the user's client device 102 and then authenticate the user and ensure the 2D code was a valid 2D code. The registrar module 615 may then forward information such as the user's ID and account number to the issuer 640, such that the issuer 640 can validate that the card is being registered to the correct user's account. The registrar module may verify or validate the registration information, or a portion thereof based on data and information stored by the server to storage.

In some implementations, the registrar module responsive to verification or validation of the registration information communicates with the issuer via the issuer's server to activate the card. In some implementations, the registrar module responsive to verification or validation of the registration information communicates with the issuer via the issuer's server to register and activate the card. In some implementations, the registrar module interfaces with a server of the issuer to implement or cause registration of the card holder of the card on the issuer's systems. For example, the registrar module may make application programming interface (API) calls or communications to the server of the issuer to facilitate, implement or configure registration of the card of card holder via application(s) of the server of the issuer.

The system 600 also includes a plurality of client devices 102. The client devices 102 may be any type of computing device, such as, but not limited to, a laptop, smart phone, tablet computer, server, or a combination thereof. As described below in relation to FIG. 7, a 2D code used to register the user's card is delivered to or provided to the device of the user, such as a device of the card holder. In some implementations, the 2D code is delivered to first client 102*b* owned by, or in use by, the user. For example, the 2D code may be sent to the user through email. Using an email application, the 2D code may be displayed on the display 124 of the first client device 102*b*. The user may then scan the displayed 2D code with a second client device 102*a*. For example, while the 2D code is displayed on the screen of the user's laptop (e.g., client device 102*b*), the user may use his smartphone (e.g., client device 102*a*) to scan the 2D code. In some implementations, the user scans the 2D code using the application 120 executing on the client device 102. The application 120 scans the 2D code using the camera 621 of the client device 102.

The client device 102 may also include any type and form of electronic wallet or mobile payment application, generally referred to as an e-wallet application 620 (the e-wallet application may also be referred to as a mobile wallet or m-wallet). In some implementations, responsive to the card begin registered with the server 610, information associated with the card, such as registration information or portions thereof, may be saved in the e-wallet application 620. The information may be saved in the e-wallet application 620 such that the user may use the card electronically upon or after registration. In some implementations, the application 120 may incorporate the e-wallet application or functionality thereof. In some implementations, the e-wallet application may be configured to request and/or obtain and/or store the 2D codes from the server. In some implementations, the e-wallet application may be configured to scan the 2D code(s) of cards of card holders and communicate with the server to register cards in the e-wallet application.

FIG. 7 illustrates a flow diagram of an embodiment of a method 700 for providing registration for the card of a card holder. In brief overview, at step 701, the server identifies a card holder for registration and/or receives a request to generate a 2D code for registration of a card holder is received. At step 702, the server generate a 2D code encoding registration information or information to register the card of the card holder via the server. At step 703, the 2D code is delivered to the card holder. At step 704, an application on device of the card holder scans the 2D code and at step 705, the server receives content from the scan of the 2D code. At step 706, the server registers the card of the card holder and/or the card holder responsive to the content from the scan of the 2D code.

Further to step 701, a card holder is identified. In some implementations, the card holder is the owner of a card, such as a credit card, loyalty card, reward card, bank card, or club card, which the card holder would like to register or otherwise register for a service in connection with or associated to the card, such as online account management of the card As an example, the user recently opened an account with a bank and would like to register and activate a new debit card associated with the account. In some implementations, the card holder is identified to the server, via the authentication module, using one or two-factor authentication. Biometric authentication may also be used. In some implementations, the card holder is identified to the server by the issuer. In some implementations, the server receives a request to generate a 2D code from the issuer for an identifier card holder and/or for a card of the card holder. In some implementations, the server identifies a plurality of card holders and/or cards of card holders, such as from the issuer. In some implementations, the server responsive to identifying a plurality of card holders and/or cards of card holders, generates or provides a request to the code generator module to generate a 2D code for the identified card holder and/or for the identified card of the card holder.

At step 702, a 2D code is generated. The issuer of the card may provide the server with registration information to include or to be encoded in the 2D code. In some implementations, some or all of the generated 2D code is encrypted with asymmetrical encryption. The generated 2D code may be a mQR code. In some implementations, the 2D code is generated responsive to receiving a request from the issuer. For example, and continuing the above bank example, after the user opens the new account with the bank, the bank may forward a request to the server requesting that a 2D registration code be generated and/or sent to the user.

At step 703, the 2D code is communicated or delivered to the card holder of the card. In some implementations, the server communicates the 2D code to a device of the card holder through a secure communication channel. In some implementations, the server communicates the 2D code to the user via a communication channel such as email, a website, SMS, push notification. In some implementations, the issuer or registrar for the issuer sends the 2D code via mail. As described above, the 2D code may be mailed to the card holder responsive to the opening the new account. In another example, the card holder may log into a website, and after entering information regarding the card, the 2D code may be delivered to the user through the website (e.g., the website generates and displays the 2D code to the user).

At step 704, the 2D code is scanned by the user using an application on the device of the user (e.g., card holder). In some implementations, the 2D code is scanned by the user with a specific client device for which the user would like to associate the registered card. For example, at the end of the registration process, information indicative of the registered card can be placed in an e-wallet application executing on the client device.

At step 705, the server receives content from a scan of the 2D code, such as encrypted and/or unencrypted registration informed encoded in the 2D code. The server may decrypt the encrypted portions of the content received from the scan of the 2D code using a private key maintained by or known by the server. The server may decrypt the encrypted portions using a decryptor module or functionality, such as via the encryption module described herein. The server may receive visible or unencrypted portions of content from the scan of the 2D code. The server may decode and/or use the decrypted content and/or the unencrypted/visible content to establish, create, obtain or provide the registration information for registering the card and/or card holder.

In some implementation of using a motion code for the 2D code and responsive to the user scanning the motion code, the application decodes the plurality of 2D codes and converts the decoded content into a byte array. All or a portion of the byte array may be transmitted back to the server. The mQR byte array may remain in its encrypted form, such that the data within the byte array cannot be read by the client device. In some implementations, the byte array may only be decrypted and read by the server using a private key maintained by the server.

In some implementations, the device appends or includes an identifier to/with the byte array for a motion code or to the content from the scan of the 2D code that is transmitted to the server. The identifier may be a device identifier (e.g., a unique identifier (UDID) or an identifier associated with the e-wallet). The server may use the identifier to link the card to the user's client device.

At step 706, the card holder and/or card is registered. Responsive to the server having the registration information, the server identifies the card and/or card holder associated with the registration information. The server may register the card and/or card holder with the issuer using the registration information. The server may register the card and/or card holder for an application or service of the issuer, such as a mobile application or online application or service. The server may maintain the registration information for subsequent utilization by the card holder or the server on behalf of the card holder. In some embodiments, the server facilitates or communicates with e-wallet application to identify, provide, validate or approve the card as a mobile payment instrument. In some implementations, the server registers the card responsive to decrypting and verifying the registration information received from the mobile application.

In some implementations, prior to completing the registration process, the server may request that the user be authenticated to ensure that the true owner of the card is registering the card. For example, the user may scan the 2D code with the application. The server may then prompt the application to request a password or pin from the user. If the user provides the correct password, the server may then complete the registration process. In some implementations, the application may request a password prior to sending the information from the 2D scan to the server. Requesting the pin or password prior to sending the information to the server, enables the password to be sent with the information from the 2D scan rather than having the server make a request back to the application on the client device. For example, instructions to request a password prior to transmitting the information to the server may be encoded in content of the scanned 2D code.

While the invention has been particularly shown and described with reference to specific embodiments, it should be understood by those skilled in the art that various changes in form and detail may be made therein without departing from the spirit and scope of the invention described in this disclosure.

What is claimed:

1. A method for providing registration of a card of a card holder via a two-dimension code, the method comprising:
    (a) identifying, by a server providing registration of cards of card holders, a card holder of a card;
    (b) generating, by the server, a two-dimension (2D) code encoded with registration information for the card of the card holder, at least a portion of the registration information encrypted via asymmetric encryption, wherein the server generates for the 2D code a motion code comprising a sequence of a plurality of 2D codes to be displayed at a frequency, each of the plurality of 2D codes encoded with a portion of the registration information; and
    (c) transmitting, by the server, to a device of the card holder, the 2D code to provide to the server for registration of the card.

2. The method of claim 1, further comprising registering, by the server, the card of the card holder upon decrypting and verification of the registration information received by the server from an application on the device of the card holder that scanned the 2D code.

3. The method of claim 2, wherein the application comprises a mobile wallet of the card holder and the card comprises a mobile payment instrument.

4. The method of claim 1, wherein (a) further comprises authenticating, by the server, the card holder via one of one-factor or two-factor authentication.

5. The method of claim 1, wherein (a) further comprises authenticating, by the server, the card holder via biometric authentication.

6. The method of claim 1, wherein (a) further comprises validating, by the server, information on one of the card or the card holder via a third party server.

7. The method of claim 1, wherein (b) further comprises receiving, by the server, at least a portion of the registration information to encode in the 2D code from a third party server.

8. The method of claim 1, wherein (b) further comprises generating, by the server, the registration information for the card of the card holder to be encoded in the 2D code.

9. The method of claim 1, wherein (b) further comprises encrypting, by the server, the registration information encoded in the 2D code.

10. The method of claim 9, further comprising decrypting, by the server, the encrypted portion of the registration information.

11. The method of claim 1, wherein (c) further comprises transmitting, by the server, the 2D code via a secure communication channel between the server and the device of the card holder.

12. The method of claim 11, further comprising validating, by the server, a portion of the registration information via a third party server.

13. The method of claim 1, further comprising receiving, by the server from the device of the card holder, content from a scan of the 2D code by the device, the content comprising the registration information.

14. The method of claim 2, further comprising registering, by the server, the card of the card holder using at least the decrypted portion of the registration information.

15. The method of claim 1, wherein the card comprises one of the following: a bank card, a loyalty card, a rewards card, a points card, an advantage card and a club card.

16. The method of claim 1, wherein the registration information comprises at least one of information visible on the corresponding card or information not visible and encoded on the corresponding card.

17. The method of claim 1, further comprising receiving, by the server, a pin assigned to the card holder from one of an application on the device of the card holder in which the card holder enters the pin via the application or from the 2D code.

18. The method of claim 17, further comprising controlling, by the server, access to the server by confirming the pin.

19. A system for providing registration of a card of a card holder via a two-dimension code, the system comprising:
   a server configured to register cards of card holders, the server comprising:
   an authentication module configured to identify a card holder of a card;
   a generator configured to generate a two-dimension (2D) code encoded with registration information for the card of the card holder, at least a portion of the registration information encrypted via asymmetric encryption; wherein the generator is configured to generate for the 2D code a motion code comprising a sequence of a plurality of 2D codes to be displayed at a frequency, each of the plurality of 2D codes encoded with a portion of the registration information; and
   a transmitter configured to transmit to a device of the card holder the 2D code to provide to the server for registration of the card.

20. The system of claim 19, wherein the server is further configured to register the card of the card holder upon decrypting and verification of the registration information received by the server from an application on the device of the card holder that scanned the 2D code.

21. The system of claim 20, wherein the application comprises a mobile wallet of the card holder and the card comprises a mobile payment instrument.

22. The system of claim 19, wherein the authenticator is configured to authenticate the card holder via one of one-factor or two-factor authentication.

23. The system of claim 19, wherein the authenticator is configured to authenticate the card holder via biometric authentication.

24. The system of claim 19, wherein the server is configured to validate registration information on one of the card or the card holder via a third party server.

25. The system of claim 19, wherein a receiver of the server is configured to receive at least a portion of the registration information to encode in the 2D code from a third party server.

26. The system of claim 19, wherein the generator is configured to generate the registration information for the card of the card holder to be encoded in the 2D code.

27. The system of claim 19, wherein the generator is further configured to encrypt the registration information encoded in the 2D code.

28. The system of claim 19, wherein the server is further configured to transmit the 2D code via a secure communication channel between the server and the device of the card holder.

29. The system of claim 28, wherein a receiver of the server is configured to receive from the device of the card holder, content from a scan of the 2D code by the device, the content comprising the registration information.

30. The system of claim 29, wherein the server comprises a decryptor configured to decrypt the encrypted portion of the registration information.

31. The system of claim 30, wherein the server comprise a registrar configured to register the card of the card holder using the decrypted portion of the registration information.

32. The system of claim 31, wherein the registrar is further configured to validate a portion of the registration information via a third party server.

33. The system of claim 19, wherein the card comprises one of the following: a bank card, a loyalty card, a rewards card, a points card, an advantage card and a club card.

34. The system of claim 19, wherein the registration information comprises at least one of information visible on the corresponding card or information not visible and encoded on the corresponding card.

35. The method of claim 19, wherein the server is further configured to receive a pin, assigned to the card holder by the server, from one of an application on the device of the card holder in which the card holder enters the pin via the application or from the 2D code.

36. The method of claim 35, wherein the server is further configured to control access to the server by validating the pin.

* * * * *